United States Patent [19]

Johnston

[11] 3,720,426

[45] March 13, 1973

[54] APPARATUS FOR SELECTIVELY ACTUATING PASSENGER SAFETY DEVICES IN VEHICLES

[76] Inventor: Harry R. Johnston, 110 Seltzer Avenue, Coatesville, Pa. 19320

[22] Filed: June 28, 1971

[21] Appl. No.: 157,569

[52] U.S. Cl........280/150 AB, 180/103, 200/61.45 R
[51] Int. Cl..............................................B60r 21/08
[58] Field of Search..........280/150 AB; 180/82, 103; 200/61.45, 61.46–61.53; 340/262

[56] References Cited

UNITED STATES PATENTS

| 3,336,045 | 8/1967 | Kobori | 280/150 AB |
| 1,915,267 | 6/1933 | Bigelow | 180/82 X |
| 2,997,557 | 8/1961 | Gillmor et al. | 200/61.45 M |
| 2,823,367 | 2/1958 | Huron | 180/82 X |
| 3,601,081 | 8/1971 | Smith | 280/150 AB X |
| 3,618,117 | 11/1971 | Kaiser | 280/150 AB X |
| 3,621,163 | 11/1971 | Hitchcock | 200/61.45 |

Primary Examiner—Kenneth H. Betts
Assistant Examiner—D. M. Mitchell
Attorney—Howson & Howson

[57] ABSTRACT

An automobile having a series of passenger-restraint devices including electrically-actuated inflatable air bags mounted at preselected locations in the passenger compartment is provided with apparatus which operates to actuate selected ones of the restraint-devices in response to front, rear or side collisions. The apparatus comprises an inverted hollow conical housing which contains a free ball and which is divided into quadrants by separate arcuate electrical contacts mounted inside and along the rim of the housing. The contacts are connected by means of circuits to the restraint devices so that in a collision the ball rolls up the conical wall of the housing and engages the contacts to close the circuits and thereby to actuate the devices. In one embodiment, the housing is divided by a diametrically-extending partition which bisects opposed ones of the contacts and a ball is mounted on each side of the partition so that when the apparatus is mounted in an automobile with the partition extending sideward of the vehicle, each ball is capable of engaging contacts corresponding either to the left or the right and the front or rear bags.

6 Claims, 6 Drawing Figures

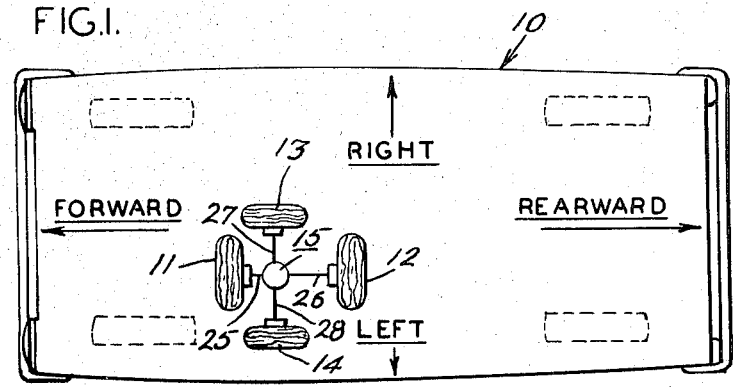
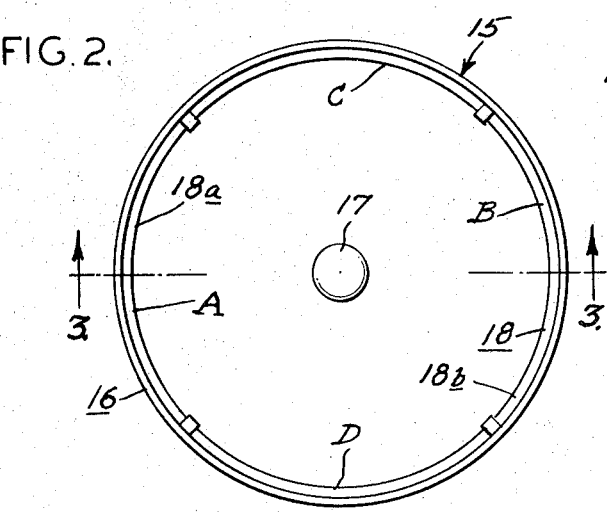
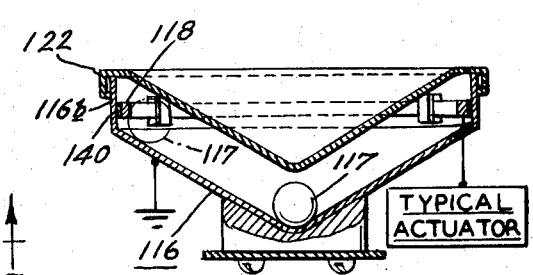
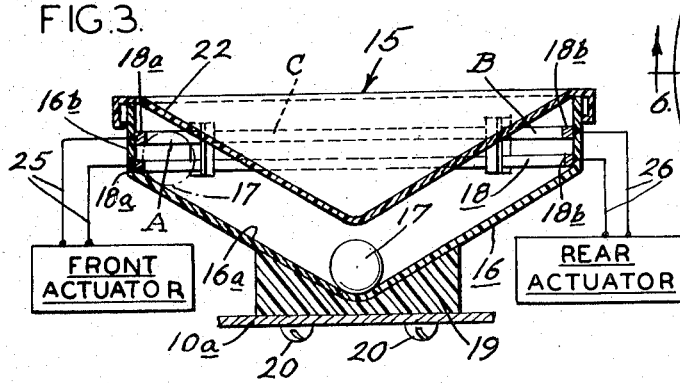
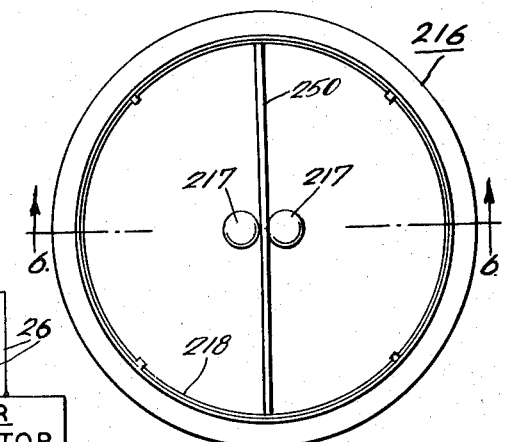
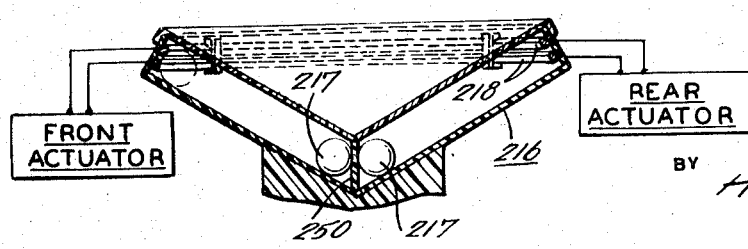
INVENTOR:
HARRY R. JOHNSTON
BY Howson & Howson
ATTYS.

APPARATUS FOR SELECTIVELY ACTUATING PASSENGER SAFETY DEVICES IN VEHICLES

The present invention relates to apparatus for use in conjunction with a series of passenger-restraint devices in an automobile to actuate selected ones of the devices in response to collisions in various directions or upsets.

Devices are known for actuating safety devices such as inflatable bags to protect passengers in an automobile from injury in the event of a collision. Examples of such devices are disclosed in U. S. Pat. Nos.: 3,510,150; 2,806,737; 2,860,003; 3,414,292; 2,902,292; and 3,430,979. Although each of these devices may operate satisfactorily to activate an inflatable bag located ahead of a passenger, non is capable of activating selected bags around the passenger in response to either front, rear or side collisions. Moreover, none of these devices is of such simple construction as to enable it to be manufactured by low-cost mass production techniques. Although an inertia switch for use in emergency devices in aircraft is disclosed in U. S. Pat. No. 2,890,303, such device does not possess selective actuation capabilities.

With the foregoing in mind, it is a primary object of the present invention to provide a novel device for actuating selected ones of a plurality of safety devices in a vehicle in response to a collision of the vehicle in various directions or an upset.

It is another object of the present invention to provide for use with passenger-restraint devices unique apparatus which is of simple construction and which is capable of being manufactured economically by mass production techniques As a further object, the present invention provides reliable actuating apparatus for use in an automobile in conjunction with safety devices of the inflatable-bag type.

More specifically, in the present invention apparatus is provided for actuating selected ones of a series of passenger restraint devices which are mounted at critical locations in the passenger compartment of an automobile to prevent serious injuries to passengers in response to collision of the automobile in various directions. The apparatus comprises a housing having an inverted conical wall and a similarly-shaped cover spaced from the wall, means for mounting the housing to the automobile, and a ball mass normally seated in the apex of the housing and confined in the housing for free displacement up the wall of the housing in response to collision-induced deceleration of the automobile. The upper level of the housing is divided into quadrants by separate electrical contact means which extends around the rim of the housing and which is disposed in the path of movement of the ball so as to be engaged by the ball. Circuit means connects the electrical contact means to the various restraint devices.

The apparatus is mounted in the vehicle with the axis of the housing disposed vertically and the quadrants arranged substantially parallel to the front, rear and sides of the automobile. Thus, upon collision of the automobile in any of these directions, the ball is displaced by inertia up the wall of the housing to engage the contact means for actuating the appropriate restraint device. In one embodiment, the contact means includes spaced parallel conductors in each quadrant with the ball completing a circuit when it engages across the conductors; in another embodiment, the housing is metal and is grounded to the frame of the automobile, and the contact means includes a single conductor insulated from the housing in each quadrant and connected by a single wire to its associated restraint device with the ball completing a circuit between selected conductors and the housing. In a still further embodiment, a partition divides the housing diametrically and bisects the side quadrants, and a ball is provided on each side of the partition so that the time required for the ball to engage the contacts in the front and rear quadrants in response to sequential front and rear collisions in reduced.

These and other objects, features and advantages of the present invention should become apparent from the following description when taken in conjunction with the accompanying drawing in which:

FIG. 1 is a schematic diagram illustrating an automobile in which is mounted a series of inflatable bags connected to apparatus embodying the present invention;

FIG. 2 is a plan view of the apparatus of FIG. 1 but with a cover of its housing removed to expose a free ball contained therein;

FIG. 3 is a sectional view taken along line 3—3 of FIG. 2 to illustrate electrical contact means mounted along the inside of a rim of the housing;

FIG. 4 is a sectional view similar to FIG. 3 but illustrating a modified embodiment of the present invention;

FIG. 5 is a view similar to FIG. 2 but of another modified embodiment of the present invention; and FIG. 6 is a sectional view similar to FIGS. 3 and 4 but taken along line 6—6 of FIG. 5.

Referring now to the drawing, there is illustrated schematically in FIG. 1 an automobile 10 in which is mounted a series of passenger safety devices, in the present instance four inflatable bags 11, 12, 13, and 14 located on the driver's side of the passenger compartment. In the conventional installation, the bags are mounted in the automobile in such a manner that the bag 11 is located ahead of the driver, the bag 12 is located behind the driver, and the bags 13 and 14 are located to the right and left, respectively, of the driver. In the illustrated automobile, only one series of bags for the driver is illustrated since in many instances the driver is the only passenger in the automobile. Of course, it should be understood that a like series of bags may be provided for each additional passenger.

Inflatable bags are customarily actuated by an electrical signal generated in response to a collision. Heretofore, however, the bag actuators have operated simultaneously to inflate all the bags regardless of the direction of the collision. Simultaneous actuation is undesirable not only because in some collisions it may be unnecessary from a safety standpoint, but also because of the possibility of the passenger's suffocating or being injured when simultaneously engaged on all sides by the bags.

The aforementioned disadvantages are avoided by the present invention which provides apparatus 15 (FIG. 1) for actuating selected ones of the bags, depending on the direction of the collision and the reaction of the collision on the passengers. For example, in response to a frontal collision, the apparatus 15 operates to actuate the front bag 11 to prevent a passenger in the front seat from being thrown against the windshield or a passenger in the back seat against the back of the front seat. In response to a rear collision, the apparatus 15 operates to actuate the rear bag 12 to prevent the passenger's head from being whipped rearwardly. The apparatus 15 operates similarly to actuate the right and left bags 13 and 14, respectively, in response to side collisions to prevent the passenger from being thrown against the doors or other passengers.

To this end, the apparatus 15 comprises a housing 15 (FIGS. 2 and 3), a free metal ball 17 providing a moveable mass in the housing 16, and electrical contact means 18 engageable by the ball 17 in response to a collision to complete a circuit to actuators for the various bags. The housing has a wall or surface 16a which inclines upwardly and outwardly in opposite directions from a base 19 which mounts the housing 16 to the frame 10a of the automobile, for instance, by means of threaded fasteners 20,20 or the like. In the illustrated embodiment, the wall 16a is continuous and has an inverted conical shape, and the housing has a continuous upstanding rim 16b surrounding the upper level of the housing. The ball 17 is contained in the housing 16 by a cover 22 which extends across the top of the housing and which is formed downwardly into a conical shape corresponding to the shape of the inside wall 16a of the housing 16. The inside of the cover 22 is spaced from the wall 16a of the housing a dimension which is slightly greater than the diameter of the ball 17. Thus, the ball 17 is permitted to move up the wall 16a; but the ball 17 is prevented from bouncing in the housing and inadvertently actuating the bags as otherwise would occur, for example, when the automobile is travelling on an undulating roadway or a roadway having a series of holes. Preferably, the cover 22 engages over the rim 21 and is removably fastened to the housing as by a friction connection, threads or the like to facilitate manufacture of the apparatus.

In order to provide the apparatus 15 with means to determine the direction of collision of the vehicle, the electrical contact means 18 is divided into quadrants A, B, C, and D within the housing, and the contact means 18 in each quadrant is connected to the actuator of one of the bags by circuit means 25, 26, 27, and 28, respectively. For example, as seen in FIGS. 1 and 3, the electrical contact means 18 in quadrant A is connected to the actuator for the front bag 11 by wires 25; the electrical contact means in quadrant B is connected to the actuator for the rear bag 12 by wires 26; and the electrical contact means in quadrants C and D are connected to the actuators for the right and left side bags 13 and 14 by wires 27 and 28, respectively.

In the embodiment illustrated in FIGS. 2 and 3, the contact means 18 comprises a pair of arcuately-shaped, electrically-conductive bars or members 18a,18a which are mounted inside the rim 16b around the upper level of the housing 16. The members 18a,18a are disposed in spaced parallel relation with one another and they are located in the path of movement of the ball 17. Preferably, the upper one of the members extends inwardly of the rim 16a a slightly greater distance than the lower member to ensure simultaneous engagement of both members by the ball, for example, as illustrated in broken lines in FIG. 3. Thus, when the front of the automobile 10 collides with another automobile or an object, the ball 17 rolls up the surface 16a and engages across the electrical contacts 18a,18a in the quadrant A to complete the circuit 25 to the actuator for the front bag 11 and thereby to inflate the bag 11. Likewise, a rear collision causes the ball 17 to roll in the opposite direction up the surface 16a to engage across the contacts 18b,18b in the quadrant B to complete the circuit 26 to actuator for the rear bag 12 and thereby to actuate the bag. A similar action occurs with respect to side collisions. As an additional advantage, the ball 17 is capable of sequentially engaging the various electrical contacts for sequentially actuating their associated bags. For instance, in a collision in which the automobile is struck in the rear after being involved in a frontal collision, the ball 17 is capable first of engaging the front contacts 18a,18a and then of engaging the rear contacts 18b,18b. Moreover, in the event that the automobile rotates on a vertical axis after a collision the ball is capable of rotating in the housing relative to the contacts to sequentially actuate the various bags.

A modified embodiment of the present invention which operates in substantially the same manner as the aforedescribed embodiment is illustrated in FIG. 4. In this embodiment, the housing 116 and cover 122 are of metal construction, and the housing 116 is grounded to the frame of the automobile. The electrical contact means 118 is electrically insulated from the rim 116b of the housing 116 by means of insulation 140, and the contact means 118 is connected through circuit means to a typical bag actuator which is also grounded to the frame of the automobile. As in the aforedescribed embodiment, the contact means 118 is separated into segments or quadrants; however, in this embodiment, the contact means comprises a single conductive element. Thus, when the ball 117 rolls up the wall of the housing 116 and engages the contact element 118, the circuit to the typical actuator is completed through the ball 117, and the housing 116, and the frame of the automobile. With this structure, it is necessary for only one wire to be run to the various bags.

A further embodiment of the present invention is illustrated in FIGS. 5 and 6 and is substantially the same structurally as the embodiment of FIGS. 2 and 3. In this embodiment, a partition 250 extends diametrically across the housing 216 to bisect opposite ones of the electrical contacts 218, and a pair of ball masses 217,217 are located on opposite sides of the partition 250. With this structure, the elapsed time required to sequentially actuate front and rear bags is substantially reduced because the corresponding reduction in the travel distance of the ball mass in the housing. As an additional advantage, each ball mass 217 is capable of engaging the bisected side contacts so that in the event that one ball 217 does not engage the right or left contacts on its side of the partition in a side collision, the other ball is capable of engaging the right or left contacts on its side of the partition. Thus, a degree of redundancy is provided for the apparatus to increase the reliability thereof. Moreover, it is noted that the rim 216b of the housing 216 is disposed at a right angle to the inclined wall of the housing, thereby eliminating the necessity of employing contact members of different sizes to ensure engagement thereacross by the ball as in the embodiment of FIGS. 2 and 3.

Apparatus having the structure of FIGS. 5 and 6 has been tested satisfactorily. In the test structure, the wall of the housing was inclined at an angle of 45° with respect to the horizontal and the slant distance from the partition to the rim of the housing was approximately 3 inches. A metal ball weighing approximately ½ ounce and approximately ½ inch in diameter was contained in the housing. The apparatus was found to engage the electrical contacts and to complete a circuit upon impact with solid objects at velocities as low as 10 miles per hour.

The apparatus of the present invention is adapted to be manufactured by low-cost mass production techniques. For instance, the housing and cover are preferably of molded plastic or pressed steel construction, and the moveable mass is preferably provided by a steel ball of the type employed in conventional ball bearings. Thus, relatively low cost but effective and reliable apparatus is provided for activating selected ones of a series of passenger safety devices in an automobile in response to collision of the automobile in various directions.

While preferred embodiments of the present invention have been described in detail, various modifications, alterations and changes may be made without departing from the spirit and scope of the present invention as defined in the appended claims.

I claim:

1. For use in conjunction with a vehicle capable of accelerating in at least two directions and having at least two electrically-actuated passenger safety devices operable to minimize injury to a passenger in response to acceleration in said directions, apparatus for actuating selected ones of said devices in response to accelerations of predetermined magnitudes in corresponding ones of said directions, comprising:

a housing having surface means inclined in said directions from a lower level to an upper level, said surface means inclining outwardly and in opposite directions from said lower level, a partition disposed transversely to said opposite directions in said housing, means for mounting said housing to said vehicle, mass means mounted in said housing for movement upwardly on said surface means in response to acceleration of said vehicle in said directions, said mass means including a pair of moveable masses with the masses being located on opposite sides of the partition, contact means mounted at said upper level in said housing and disposed in the normal path of movement of the mass means, said contact means being separated into segments corresponding in number to said directions, and circuit means for connecting each segment of said contact means to its corresponding safety device, whereby acceleration of the vehicle in one of said directions displaces the mass means up one of the surface means to engage the contact means for actuating the safety devices associated therewith.

2. Apparatus according to claim 1 wherein said mass means includes a metal ball and including an inverted hollow cone providing said surface means with said lower level corresponding substantially to the apex of the cone and said upper level corresponding substantially to the rim of the cone.

3. Apparatus according to claim 1 including a cover mounted on said housing and spaced from said inclined surface means to permit passage of said mass means therebetween but to prevent substantial random upward displacement of said mass means in the housing.

4. Apparatus according to claim 1 wherein said inclined surface means and said mass means are of electrically-conductive materials and said contact means includes electrically conductive elements disposed transversely to the path of movement of the mass means, insulator means mounting said elements to said housing, said circuit means connecting said inclined surface means and said contact elements to their respective safety devices so that a circuit is established between the inclined surface means and the contact elements by the mass means for actuating the safety devices when the mass means engages the elements.

5. Apparatus according to claim 1 wherein said contact means includes a pair of electrically-conductive contact members disposed in spaced parallel relation with one another and transversely to the path of movement of the mass means, said circuit means connecting said members to said safety devices so that a circuit is established between the contact members for actuating the safety devices when the mass means engages across the members.

6. Apparatus according to claim 1 wherein said surface means also inclines in the direction of said partition, and said contact means includes segments disposed transversely to said partition and extending on opposite sides thereof, whereby additional safety devices may be actuated in response to acceleration in the direction of said partition.

* * * * *